Figure 5:
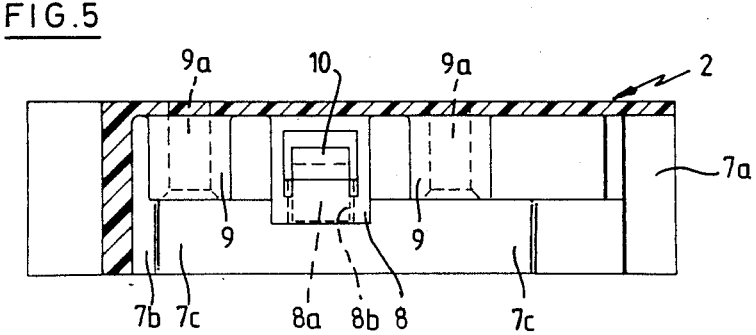

United States Patent [19]

Scorsiroli

[11] Patent Number: 4,951,343
[45] Date of Patent: Aug. 28, 1990

[54] CONNECTOR FOR WIPER BLADES

[75] Inventor: Marcello Scorsiroli, Turin, Italy

[73] Assignee: Champion Spark Plug Italiana SpA, Italy

[21] Appl. No.: 275,372

[22] Filed: Nov. 23, 1988

[51] Int. Cl.$^5$ .................................................. B60S 1/40
[52] U.S. Cl. ............................... 15/250.32; 15/250.42
[58] Field of Search ............ 15/250.32, 250.42, 250.31, 15/250.33, 250.34, 250.35, 250.36, 250.37, 250.38, 250.39, 250.40, 250.41; 403/320, 323

[56] References Cited

U.S. PATENT DOCUMENTS

| | | | |
|---|---|---|---|
| 1,474,005 | 11/1923 | Sherman | 15/250.23 X |
| 1,474,006 | 11/1923 | Sherman | 15/250.23 X |
| 1,662,290 | 3/1928 | Arey | 15/250.23 X |
| 2,086,453 | 7/1937 | Ward | 15/250.32 X |
| 3,824,648 | 7/1974 | Berg et al. | 15/250.32 |
| 3,961,394 | 6/1976 | Steger | 15/250.32 |
| 4,042,306 | 8/1977 | Murray | 403/320 X |
| 4,180,885 | 1/1980 | Thornton et al. | 15/250.32 |
| 4,348,782 | 9/1982 | Fournier | 15/250.32 |

FOREIGN PATENT DOCUMENTS 0141186 9/1984 European Pat. Off. .
2533517 3/1984 France .

*Primary Examiner*—Frankie L. Stinson
*Attorney, Agent, or Firm*—Wood, Phillips, Mason, Recktenwald & Vansanten

[57] ABSTRACT

The connector according to the invention comprises a body 2 provided with a generally hook-shaped lateral recess 7a, 7c and a laterally removable element 3 having the same shape as said recess 7a, 7c. For mounting the connector onto a hook-end or onto a straight-end wiper arm said arm (4) is first inserted into said recess 7a, 7c and the laterally removable element 3 is then screwed onto the body 2 of the connector. When the screw 13 of the element 3 is screwed into the portin 8 of the body 2 it pushes upwards, against the wiper arm 4, the hinged portion 10 of the body 2 of the connector and thus locks the wiper arm 4 in the connector.

11 Claims, 3 Drawing Sheets

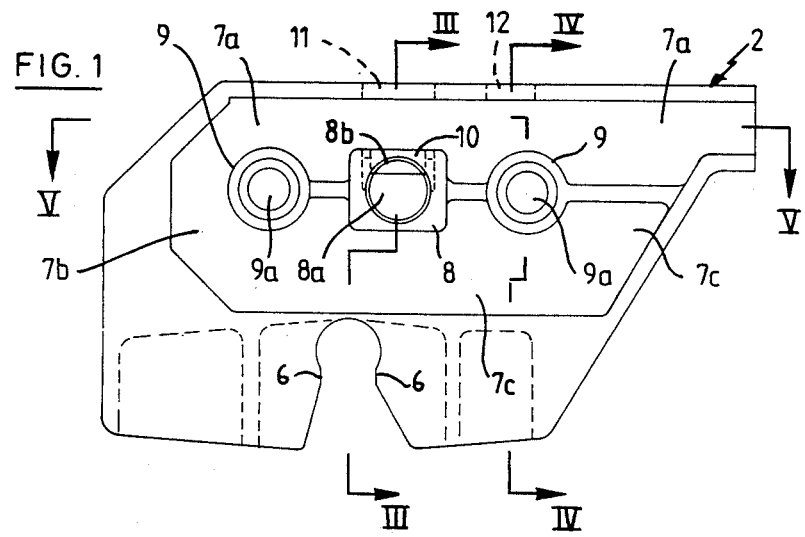
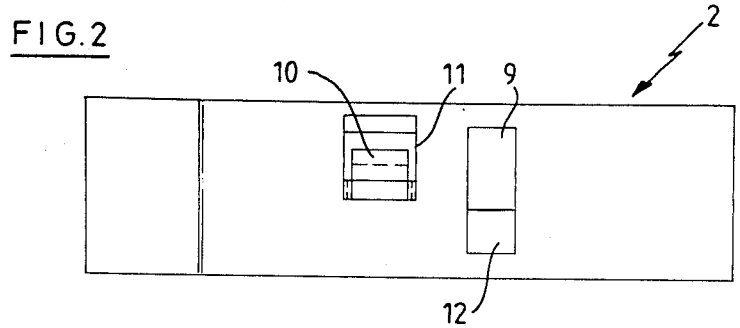

CONNECTOR FOR WIPER BLADES

The present invention relates to a connecting device or connector for selectively connecting several types of wiper arms of different transverse dimensions to a wiper blade for motor vehicles or the like.

Connectors of the thus defined type are well known in prior art and in particular through French patent application 2,533,517 and through the European patent application 0 141 186 which both disclose a connector capable of being selectively attached to the free end portion of four different wiper arms.

The main disadvantage of said two connectors and of similar prior art connectors is the fact that they generally have a very complicated structure and that therefore the user often does not know how to correctly attach the connectors to a wiper arm of a given type.

It is therefore the object of the invention to provide a connector which has a simple structure and which can be easily selectively attached to the free end portion of at least two types of wiper arms of different transverse dimensions.

The connector according to the invention is substantially characterized by the fact that it comprises a body provided with a lateral recess capable of selectively receiving the free end portions of said wiper arms and a laterally removable element capable of being inserted into said lateral recess and capable of being secured to the body of the connector by means of a screw of which the corresponding female element comprises a hinged portion capable of being pressed against the free end portions of the wiper arms when said screw is screwed into said corresponding female element.

It is to be noted that said female element of the screw is an integral part of the body of the connector and that the configuration of said recess in the body of the connector is such that it is capable of selectively receiving wiper arms of which the free end portions are either straight or hook-shaped.

As known in prior art straight-end wiper arms may be provided at their top surface with a stud or detent. The body of the connector is therefore provided with an opening corresponding to said stud or detent of the wiper arm.

A further feature of the connector according to the invention is the fact that the laterally removable element comprises at least one laterally projecting stud and that the body of the connector comprises at least one corresponding opening for receiving said stud or studs. The object of this feature is to facilitate the insertion of the laterally removable element into the lateral recess of the body of the connector.

Figure 6:
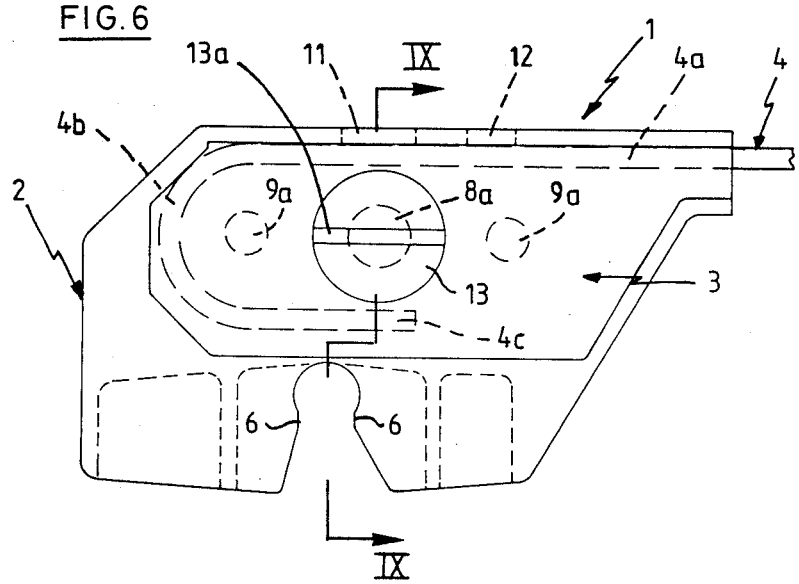
Figure 7:
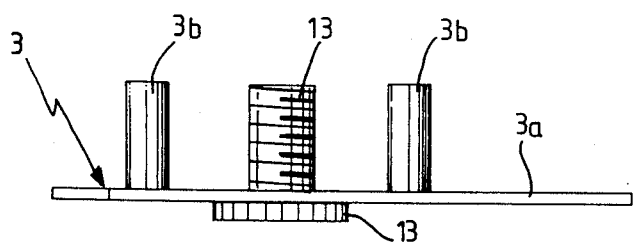
Figure 8:
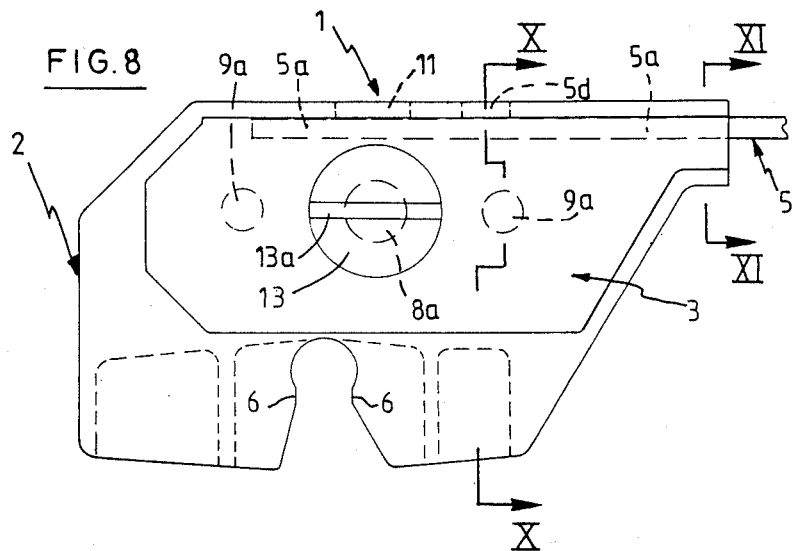
Figure 9:
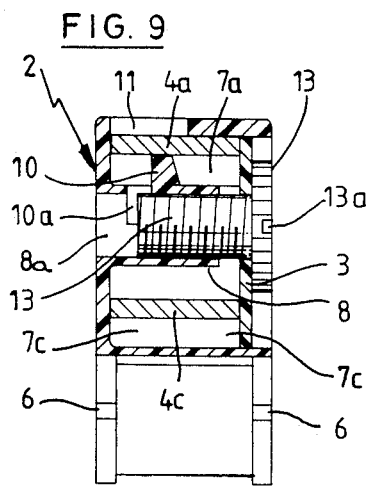
Figure 10:
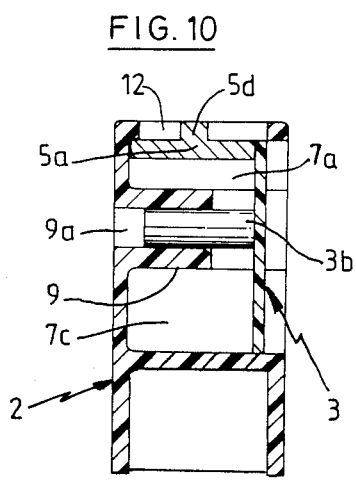
Figure 11:
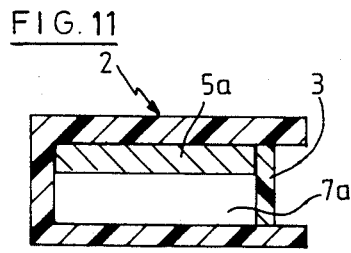
Figure 12:
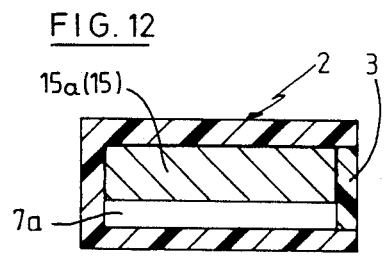

The connector according to the invention will be better understood when reading the following portions of the description in conjunction with the appended drawings, wherein:

FIG. 1 is an elevational view of the body of the connector according to the invention, FIG. 2 is a top view of the view of the body of the connector according to FIG. 1, FIG. 3 is a sectional view along line III—III of FIG. 1, FIG. 4 is a sectional view along line IV—IV of FIG. 1, FIG. 5 is a sectional view along line V—V of FIG. 1, FIG. 6 is an elevational view of the connector according to the invention, mounted on a hook-end wiper arm, FIG. 7 is a top view of the laterally removable element of the connector of FIG. 6, FIG. 8 is an elevational view of the connector according to the invention, mounted on a straight-end wiper arm, FIG. 9 is a sectional view along line IX—IX of FIG. 6, FIG. 10 is a sectional view along line X—X of FIG. 8, FIG. 11 is an enlarged sectional view along line XI—XI of FIG. 8, and, FIG. 12 is a sectional view similar to that of FIG. 11, but showing a wiper arm of different dimensions.

According to FIGS. 1 through 5 the body 2 of the connector according to the invention is made in one piece and essentially comprises: snap-on means 6 for rotatably securing it to a wiper blade (not shown), a lateral recess 7a, 7b, 7c, one inwardly projecting portion 8 provided with an opening 8a and two inwardly projecting portions 9 respectively provided with an opening 9a.

FIG. 7 shows the laterally removable element 3 which can be inserted into the lateral recess 7a, 7b, 7c of the body 2 of the connector and which comprises a flat portion 3a and two laterally projecting studs 3b. A screw 13 is shown inserted into an opening (not shown) provided in the flat portion 3a. In FIGS. 6 and 8 the thus described laterally removable element 3 is mounted on the connector 1.

As can be seen in FIGS. 1, 3, 5 the opening 8a in the body 2 of the connector is provided with a thread 8b, said thread corresponding to the thread of the screw 13. Moreover the female element of the screw 13, i.e. the inwardly projecting portion 8 of the body 2 of the connector is provided with a hinged portion 10 (FIGS. 1, 2, 3, 5) located in the opening 10a (FIG. 3) of said inwardly projecting portion 8.

When the two parts (body 2 and laterally removable element 3) of the connector are being assembled the two studs 3b of the element 3 enter into the openings 9a provided in the body 2 of the connector. The screw 13 is then screwed into the opening 8a of the body 2 by means of a coin (groove 13a, FIGS. 6 and 8). When the screw 13 is further screwed into the opening 8a it will push the hinged portion 10 (FIG. 3) upwards. As will be explained hereunder, it is this upward movement of the hinged portion 10 which will lock a wiper arm end in the connector, or, in other words, will rigidly secure the connector to the arm end.

The lateral recess in the body of the connector (FIG. 1) comprises 3 portions, i.e. a straight longitudinal top portion 7a, a vertical front portion 7b and a straight longitudinal bottom portion 7c. Said three portions 7a, 7b, 7c correspond to the three portions 4a, 4b, 4c of a hook-end wiper arm 4 (FIG. 6) while the straight longitudinal top portion 7a corresponds to the free end portion 5a of a straight-end wiper arm 5 (FIG. 8).

For connecting a wiper blade to a wiper arm by means of the connector according to the invention the connector is first attached to the wiper arm, i.e. the free end portion of the wiper arm is inserted into the lateral recess 7a, 7b, 7c as shown in FIG. 6 for a hook-end arm and in FIG. 8 for a straight-end arm. The laterally removable element 3 is then screwed onto the body 2 of the connector and the connector is attached to the wiper blade by means of the snap-on means 6 (as known in prior art).

Once the connector is assembled on the wiper arm the screw 13 has pushed the hinged portion 10 upwards as shown in FIG. 9, i.e. said hinged portion 10 locks the wiper arm 4 (or 5) in the connector since it exerts a very substantial pressure on said wiper arm. Moreover the wiper arm 4 (or 5) is laterally locked by the body 2 on one of its sides and by the laterally removable element 3 on its other side.

FIG. 10 shows that when the connector is assembled on the wiper arm 5 (or 4) the two studs 3b of the laterally removable element 3 protrude into the openings 9a of the body 2 of the connector. The studs 3b facilitate the insertion of the laterally removable element 3 into the lateral recess 7a, 7b, 7c, but they also reinforce the whole structure of the connector.

As can be seen on FIGS. 8 and 10 the straight-end wiper arm 5, 5a is provided with a stud or detent 5d on its top surface. Said stud or detent is located in the opening 12 (FIGS. 1, 2) provided in the body 2 of the connector and further prevents any longitudinal movement of the connector with respect to the wiper arm.

It is to be noted that the opening 11 provided in the top surface of the connector and shown in particular in FIGS. 1, 2, 3 serves only for manufacturing the connector according to the invention.

FIGS. 11 and 12 show that the connector according to the invention can be selectively mounted on wiper arms 5a, 15a of different transverse dimensions.

I claim:

1. A connector for selectively connecting several types of wiper arms (4, 5, 15) of different transverse dimensions to a wiper blade for motor vehicles or the like, characterized in that said connector comprises a body (2) provided with a lateral recess (7a, 7b, 7c) capable of selectively receiving the free end portions (4a, 4b, 4c; 5a, (15a) of said wiper arms (4, 5, 15) and a laterally removable element (3) capable of being inserted into said lateral recess (7a, 7b, 7c) and capable of being secured to the body (2) of the connector (1) by means of a screw (13) and cooperating female element (8), said female element having an opening for reception of said screw and a hinged portion (10) capable of being deflected and pressed against the free end portions (4a, 4b, 4c; 5a, 15a) of the wiper arms (4, 5, 15) as an incident of said screw being screwed into the opening in said female element (8).

2. A connector according to claim 1, characterized in that the configuration of said recess (7a) is such that it is capable of selectively receiving wiper arms (5, 15) of which the free end portions (5a, 15a) are straight.

3. A connector according to claim 1, characterized in that the configuration of said recess (7a7b, 7c) is such that it is capable of selectively receiving wiper arms (4) of which the free end portions (4a, 4b, 4c) are hook-shaped, said connector entirely surrounding the hook-shaped free end of a wiper arm with the wiper arm and the connector operatively engaged.

4. A connector for selectively connecting several types of wiper arms (4, 5, 15) of different transverse dimensions to a wiper blade for motor vehicles or the like, characterized in that it comprises a body (2) provided with a lateral recess (7a, 7b, 7c) capable of selectively receiving the free end portions (4a, 4b, 4c; 5a, 15a) of said wiper arms (4, 5, 15) and a laterally removable element (3) capable of being inserted into said lateral recess (7a, 7b, 7c) and capable of being secured to the body (2) of the connector (1) by means of a screw (13) and cooperating female element (8), said female element (18) having a hinged portion (10) capable of being pressed against the free end portions (4a, 4b, 4c; 5a, 15a) of the wiper arms (4, 5, 15) when said screw is screwed into said female element (8), wherein the female element (8) is an integral part of the body (2) of the connector (1).

5. A connector according to claim 4, characterized in that the configuration of said recess (7a) is such that it is capable of selectively receiving wiper arms (5, 15) of which the free end portions (5a, 15a) are straight.

6. A connector according to claim 4, characterized in that the configuration of said recess (7a, 7b, 7c) is such that it is capable of selectively receiving wiper arms (4) of which the free end portions (4a, 4b, 4c) are hook-shaped.

7. A connector according to claim 5, characterized in that the laterally removable element (3) comprises at least one laterally projecting stud (3b) and that the body (2) of the connector (1) comprises at least one corresponding opening (9a) for receiving said stud (3b) or studs (3b).

8. A connector for selectively connecting several types of wiper arms (4, 5, 15) of different transverse dimensions to a wiper blade for motor vehicles or the like, characterized in that it comprises a body (2) provided with a lateral recess (7a, 7b, 7c) capable of selectively receiving the free end portions (4a, 4b, 4c; 5a, 15a) of said wiper arms (4, 5, 15) and a laterally removable element (3) capable of being inserted into said lateral recess (7a, 7b, 7c) and capable of being secured to the body (2) of the connector (1) by means of a screw (13) and cooperating female element (8), said female element having a hinged portion (10 ) capable of being pressed against the free end portions (4a, 4b, 4c; 5a, 15a) of the wiper arms (4, 5, 15) when said screw is screwed into said corresponding female element (8), wherein the laterally removable element (3) comprises at least one laterally projecting stud (3b) and that the body (2) of the connector (1) comprises at least one corresponding opening (9a) for receiving said stud 3(b) or studs (3b).

9. A connector for selectively connecting several types of wiper arms (4, 5, 15) of different transverse dimensions to a wiper blade for motor vehicles or the like, characterized in that it comprises a body (2) provided with a lateral recess (7a, 7b, 7c) capable of selectively receiving the free end portions (4a, 4b, 4c; 5a, 15a) of said wiper arms (4, 5, 15) and a laterally removable element (3) capable of being inserted into said lateral recess (7a, 7b, 7c) and capable of being secured to the body (2) of the connector (1) by means of a screw (13) and cooperating female element (8), said female element having a hinged portion (10 ) capable of being pressed against the free end portions (4a, 4b, 4c; 5a, 15a) of the wiper arms (4, 5, 15) when said screw is screwed into said corresponding female element (8), wherein the configuration of said recess (7a) is such that it is capable of selectively receiving wiper arms (5, 15) of which the free end portions (5a, 15a) are straight and the laterally removable element (3) comprises at least one laterally projecting stud (3b) and the body (2) of the connector (1) comprises at least one corresponding opening (9a) for receiving said stud (3b) or studs (3b).

10. A connector for selectively connecting several types of wiper arms (4, 5, 15) of different transverse dimensions to a wiper blade for motor vehicles or the like, characterized in that it comprises a body (2) provided with a lateral recess (7a, 7b, 7c) capable of selectively receiving the free end portions (4a, 4b, 4c; 5a, 15a) of said wiper arms (4, 5, 15) and a laterally removable element (3) capable of being inserted into said lateral recess (7a, 7b, 7c) and capable of being secured to the body (2) of the connector (1) by means of a screw (13) and cooperating female element (8), said female element (8) comprising a hinged portion (10) capable of being pressed against the free end portions (4a, 4b, 4c; 5a, 15a) of the wiper arms (4, 5, 15) when said screw is screwed into said corresponding female element (8), wherein the female element (8) of the screw (13) is an integral part of the body (2) of the connector (1), the configuration of said recess (7a) is such that it is capable of selectively receiving wiper arms (5, 15) of which the free portions (5a, 15a) are straight, the laterally removable element (3) comprises at least one laterally projecting stud (3b) and the body (2) of the connector (1) comprises at least one corresponding opening )9a) for receiving said stud (3b) or studs (3b).

11. A connector for selectively connecting several types of wiper arms (4, 5, 15) of different transverse dimensions to a wiper blade for motor vehicles or the like, characterized in that it comprises a body (2) provided with a lateral recess (7a, 7b, 7c) capable of selectively receiving the free end portions (4a, 4b, 4c; 5a, 15a) of said wiper arms (4, 5, 15) and a laterally removable element (3) capable of being inserted into said lateral recess (7a, 7b, 7c) and capable of being secured to the body (2) of the connector (1) by means of a screw (13) and cooperating female element (8), said female element comprising a hinged portion (10) capable of being pressed against the free end portions (4a, 4b, 4c; 5a, 15a) of the wiper arms (4, 5, 15) when said screw is screwed into said corresponding female element (8), wherein the configuration of said recess (7a) is such that it is capable of selectively receiving wiper arms (5, 15) of which the free portions (5a, 15a) are straight and the straight free end portion (5a) of the wiper arm (5) is provided with a stud (5d) on its top surface, characterized in that the body (2) of the connector is provided with an opening (12) corresponding to said stud (5d).

* * * * *

UNITED STATES PATENT AND TRADEMARK OFFICE
CERTIFICATE OF CORRECTION

PATENT NO. : 4,951,343

DATED : August 28, 1990

INVENTOR(S) : Marcello Scorsiroli

It is certified that error appears in the above-identified patent and that said Letters Patent is hereby corrected as shown below:

In the Abstract, line 9, --portin-- should be --portion--.

Column 3, line 38 (claim 1), remove the "(" before --15a--.

Column 3, line 54 (claim 3), add a --,-- between --7a-- and --7b--.

Column 4, line 3 (claim 4), --18-- should be --8--.

Column 4, line 18 (claim 7), --5-- should be --4--.

Column 5, line 19 (claim 10), -")"- should be -"("-.

Column 6, line 17 (claim 11), --end-- should be added after --free--.

Signed and Sealed this

Seventh Day of July, 1992

Attest:

DOUGLAS B. COMER

Attesting Officer

Acting Commissioner of Patents and Trademarks